US 11,098,632 B2

(12) United States Patent
Holz et al.

(10) Patent No.: US 11,098,632 B2
(45) Date of Patent: Aug. 24, 2021

(54) PARTICLE SENSOR FOR AN INTERNAL COMBUSTION ENGINE (71) Applicant: Vitesco Technologies Germany GMBH, Hannover (DE)

(72) Inventors: Daniel Holz, Falkenstein (DE); Christian Kiefl, Münster (DE)

(73) Assignee: Vitesco Technologies Germany GmbH, Hannover (DE)

( * ) Notice: Subject to any disclaimer, the term of this patent is extended or adjusted under 35 U.S.C. 154(b) by 8 days.

(21) Appl. No.: 16/809,989

(22) Filed: Mar. 5, 2020

(65) Prior Publication Data
US 2020/0200065 A1 Jun. 25, 2020

Related U.S. Application Data (63) Continuation of application No. PCT/EP2018/073692, filed on Sep. 4, 2018.

(30) Foreign Application Priority Data

Sep. 6, 2018 (DE) ...................... 10 2017 215 689.9

(51) Int. Cl.
F01N 13/00 (2010.01)
F01N 11/00 (2006.01)
G01M 15/10 (2006.01)

(52) U.S. Cl.
CPC .......... *F01N 13/008* (2013.01); *F01N 11/007* (2013.01); *G01M 15/102* (2013.01); *F01N 2900/1606* (2013.01)

(58) Field of Classification Search
CPC .... F01N 11/07; F01N 13/008; F01N 2560/05; F01N 2900/1606; G01M 15/102; G01N 1/2252; G01N 15/0656; G01N 2001/2285
See application file for complete search history.

(56) References Cited

U.S. PATENT DOCUMENTS 645,923 A 3/1900 Taylor et al.
6,230,572 B1 5/2001 Pui et al.
(Continued)

FOREIGN PATENT DOCUMENTS

DE 102006006112 A1 8/2007
DE 102011011637 A1 9/2012
(Continued)

OTHER PUBLICATIONS

International Search Report and Written Opinion dated Dec. 5, 2018 from corresponding International Patent Application No. PCT/EP2018/073692.
(Continued)

*Primary Examiner* — John Fitzgerald
*Assistant Examiner* — Jean F Morello (57) ABSTRACT

A particle sensor which has a housing, in which a measuring region extending along a longitudinal axis is arranged, a sensor electrode, which is arranged in the measuring region and has a measuring section, which extends coaxially to the longitudinal axis, and a flow conducting element, which is arranged in the measuring region and has at least one first flow conducting section, which extends coaxially to the longitudinal axis, and at least one second flow conducting section, which extends coaxially to the longitudinal axis and which is arranged with respect to the longitudinal axis within the first flow conducting section. The measuring section, the first flow conducting section and the second flow conducting section are arranged engaging in one another such that the measuring section is arranged with respect to the longitudinal axis between the first flow conducting section and the second flow conducting section in the radial direction.

11 Claims, 3 Drawing Sheets

(56) References Cited

U.S. PATENT DOCUMENTS

| | | | |
|---|---|---|---|
| 8,713,991 | B2 | 5/2014 | Allmendinger et al. |
| 10,443,527 | B2 * | 10/2019 | Bumberger ......... F02D 41/1445 |
| 2012/0312074 | A1 | 12/2012 | Allmendinger et al. |

FOREIGN PATENT DOCUMENTS

| | | | |
|---|---|---|---|
| DE | 102012205588 A1 | 10/2013 | |
| DE | 102015209262 A1 | 11/2016 | |
| DE | 102016115544 A1 | 3/2017 | |
| DE | 102015224460 A1 | 6/2017 | |
| EP | 2237018 A1 | 10/2010 | |
| JP | H06159035 A | 6/1994 | |

OTHER PUBLICATIONS

German Office Action dated Aug. 6, 2018 for corresponding German Patent Application No. 10 2017 215 689.9.

* cited by examiner

FIG 1

FIG 5

PARTICLE SENSOR FOR AN INTERNAL COMBUSTION ENGINE

CROSS-REFERENCE TO RELATED APPLICATIONS

This application claims priority to PCT Application PCT/EP2018/073692, filed Sep. 4, 2018, which claims priority to German Patent Application No. DE 10 2017 215 689.9, filed Sep. 6, 2017. The disclosures of the above applications are incorporated herein by reference.

FIELD OF THE INVENTION

The present invention relates to a particle sensor for detecting a quantity of particles in a gas stream, such as an exhaust gas stream, in an internal combustion engine.

BACKGROUND OF THE INVENTION

The reduction of exhaust gas emissions in motor vehicles is an important objective when developing new motor vehicles. Therefore, combustion processes in internal combustion engines are thermodynamically optimized, so that the efficiency of the internal combustion engine is significantly improved. In the motor vehicle sector there is an increasing use of diesel engines, which, with a modern design, have a very high efficiency. However, the disadvantage of this combustion technology compared to optimized spark-ignition engines is the emission of soot and/or particles. Because of the polycyclic aromatics, soot and/or particles have a highly carcinogenic effect, which has already prompted various regulations. For example, exhaust gas emission standards with maximum limits for the emissions of soot have been issued. In order to be able to meet the exhaust gas emission standards comprehensively for motor vehicles with diesel engines, there is a need to produce inexpensive sensors that reliably measure the soot content in the exhaust gas stream of the motor vehicle.

The use of such soot sensors serves for measuring the currently emitted quantity of soot and/or particles, in order that the engine management system in a motor vehicle is provided with information in a current driving situation in order to reduce the emission values through technical control adjustments. Moreover, the soot sensors may be used to initiate active exhaust gas purification by use of exhaust gas soot filters or exhaust gas recirculation to the internal combustion engine may take place. In the case of soot filtering, filters which may be regenerated, such as for example particle filters, and which filter out and capture a significant part of the soot content from the exhaust gas are used. Soot sensors are required for the detection of soot in order to monitor the function of the soot filters or in order to control their regeneration cycles. For this purpose, a soot sensor may be connected upstream or downstream of the soot filter, which is also referred to as a diesel particle filter.

The soot or particle sensor connected upstream of the particle filter serves for increasing the reliability of the system and for ensuring operation of the particle filter under optimum conditions. Since this depends to a great extent on the quantity of particles trapped in the particle filter, accurate measurement of the particle concentration upstream of the particle filter system, such as the determination of a high particle concentration upstream of the particle filter, is very important.

A soot or particle sensor connected downstream of the particle filter provides the possibility of performing vehicle-specific diagnostics and also serves for ensuring the correct operation of the exhaust gas after-treatment system.

The prior art presents various approaches to detecting soot and particles. One approach that has been widely adopted in laboratories is to use light control by the soot particles. This procedure is suitable for sophisticated measuring devices. If it is attempted also to use this as a mobile sensor system in the exhaust branch, it must be noted that approaches for implementing an optical sensor in a motor vehicle entail very high costs. Furthermore, there are unsolved problems regarding the contamination of the required optical windows by combustion exhaust gases.

Particle or gas sensors are known from U.S. Pat. No. 8,713,991 B2, DE 10 2006 006 112 A1, U.S. Pat. No. 6,454,923 B1 and EP 2 237 018 B1.

DE 10 2010 011 637 A1 discloses a flow conducting device for a sensor.

SUMMARY OF THE INVENTION

The present invention is therefore based on the object of providing a particle sensor in which a gas stream flowing through the particle sensor is optimized with respect to the flow guidance and which is improved with regard to the measurement accuracy.

This object is achieved with a particle sensor according to the disclosure. Preferred configurations are also specified in the disclosure.

The present invention is essentially based on the idea of at least partially improving the sensitivity of a particle sensor, such as an electrostatic particle sensor, by virtue of the fact that the active measuring surface or the active flow path of the sensor electrode over which the gas to be examined may flow in the particle sensor may be increased in that the gas stream is conducted through the particle sensor in such a way that it makes maximum use of the available measuring surface or flow path in an efficient manner. It has been found that in electrostatic particle sensors the relationship between the measuring signal and the measured variable is influenced by the effective measuring surface or by the active flow path. The greater the active measuring surface or the active flow path of the sensor electrode is, the greater the measuring signal also is. The general functional principle of an electrostatic particle sensor is known for example from U.S. Pat. No. 8,713,991 B2.

Consequently, the present invention proposes providing a nested arrangement of the measuring electrode and the flow conducting element, in order that the effective measuring surface and also the active flow path of the measuring electrode may be increased. These are elements arranged concentrically to one another, which are at least partially hollow and at least partially engage in one another. Therefore, the interengaging elements have at least partially different diameters.

Thus, a particle sensor, such as an electrostatic particle sensor, for detecting a quantity of particles in a gas stream in an internal combustion engine is disclosed, which sensor has a housing, in which a measuring region extending along a longitudinal axis is arranged, a sensor electrode, which is arranged in the measuring region and has an at least partially hollow measuring section, which extends coaxially to the longitudinal axis, and a flow conducting element, which is arranged in the measuring region and has at least one first flow conducting section, which extends coaxially to the longitudinal axis and is at least partially hollow, and at least one second flow conducting section, which extends coaxially to the longitudinal axis and is at least partially hollow and which is arranged with respect to the longitudinal axis within the first flow conducting section. The measuring section, the first flow conducting section and the second flow conducting section are arranged engaging in one another in such a way that the measuring section is arranged with respect to the longitudinal axis between the first flow conducting section and the second flow conducting section in the radial direction.

Due to this relative arrangement of the measuring section with respect to the first and second flow conducting sections, the gas stream is guided in such a way that it flows at least partially over the radially outer surface of the measuring section and also over the radially inner surface of the measuring section, and thus both the effective measuring surface and the effective measuring path of the sensor electrode are used almost to the maximum. In contrast to this, in the case of a particle sensor known from the prior art, the gas to be examined flows only over the radially outer surface of the measuring section, as a result of which a significant increase in the measuring surface or the measuring path of the measuring section is achieved with the present invention. The length of the active measuring path is increased with the present invention. This may lead to an increase in the time during which the particles in the gas stream are in the active measuring path, and thus also to a greater likelihood that these particles will accumulate on one of the electrodes.

In addition, the present invention may have the advantage that, on account of the increased length of the active measuring path, broken-off dendrites, which consist of the particles accumulated on the electrodes, collide more frequently with the electrodes, and consequently there are also multiple current pulses.

In a preferred configuration of the particle sensor according to the invention, the at least one first flow conducting section is arranged with respect to the longitudinal axis outside around the at least one measuring section in the radial direction in such a way that a first flow path is formed between the housing and the first flow conducting section in such a way that the gas stream flows through the first flow path along a first direction, and a second flow path is formed between the measuring section and the first flow conducting section in such a way that the gas stream flows through the second flow path along a second direction essentially opposite to the first direction. In addition, it is preferred in this configuration that the at least one second flow conducting section is arranged with respect to the longitudinal axis within the measuring section in the radial direction in such a way that a third flow path is formed between the measuring section and the second flow conducting section in such a way that the gas stream flows through the third flow path along the first direction, and a fourth flow path is formed within the second flow conducting section in such a way that the gas stream flows through the fourth flow path along the second direction.

The gas stream (considered in a sectional view along the longitudinal axis) is guided essentially in a serpentine manner through the particle sensor and the effective measuring surface or the active measuring path provided by the hollow measuring section is used efficiently and almost to the maximum, which in turn leads to a greater measuring signal that is evaluated better.

In such a preferred configuration, it is also advantageous to provide a deflection element, which is formed so as to deflect the gas stream flowing through the first flow path into the second flow path by a predetermined angle. The predetermined angle is preferably in a range between approximately 150° and approximately 210°, more preferably between approximately 170° and 190°, and is most preferably approximately 180°.

In a further advantageous configuration of the particle sensor according to the invention, the flow conducting element also has a base section, which is coupled to the at least one first flow conducting section and the at least one second flow conducting section and from which the at least one first flow conducting section and the at least one second flow conducting section extend in each case in the same direction.

In a preferred manner, the measuring section is essentially of a hollow-cylindrical or funnel-shaped or conical design. In addition or as an alternative, the first flow conducting section is essentially of a hollow-cylindrical or funnel-shaped or conical design and/or the second flow conducting section is essentially of a hollow-cylindrical or funnel-shaped or conical design. It is preferred if the measuring section, the at least one first flow conducting section and the at least one second flow conducting section each have the same hollow configuration, in order that the interengagement of these regions may take place efficiently.

It is also advantageous if the sensor electrode has a rod-shaped central section, which extends along the longitudinal axis and is arranged within the second flow conducting section. The central section may in turn lead at least partially to an increase in the active measuring surface or the active measuring path of the sensor electrode.

In a further preferred configuration of the particle sensor according to the invention, an outlet opening, which extends in the housing along the longitudinal axis and through which the gas stream may flow out of the measuring region, is also provided. The outlet opening is preferably located in the base section of the flow conducting element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features and objects of the present invention will become apparent to a person skilled in the art by putting the present teaching into practice and taking into consideration the accompanying drawings, in which.

DETAILED DESCRIPTION OF THE PREFERRED EMBODIMENTS

The following description of the preferred embodiment(s) is merely exemplary in nature and is in no way intended to limit the invention, its application, or uses.

Elements of the same design or function are denoted by the same reference designations throughout the figures. For reasons of clarity, it may be the case that not all elements are identified by reference numerals in all of the figures shown.

In the context of the present disclosure, the "active measuring surface" of the sensor electrode describes the surface of the sensor electrode with which the gas may come into contact with the sensor electrode when flowing through the particle sensor. Electrical power, such as high voltage, is applied to the sensor electrode and the particles in the gas to be examined may accumulate on the active measuring surface and form dendrites. In addition, dendrites may form on the low-voltage electrode, which is for example represented by the flow conducting element. As from a certain dendrite size, these break off and emit an electrical current pulse to the flow conducting element, which is grounded. Alternatively, the dendrites broken off from the low-voltage electrode take up an electrical charge when they contact the high-voltage electrode, for example the sensor electrode. These current pulses (positive and/or negative) are measured and may indicate the particle concentration in the exhaust gas.

The greater the active measuring surface or the active measuring path of the sensor electrode is, the more dendrites may form on the active measuring surface and the larger the number of current pulses may be. As a result, the measuring signal generated by the current pulses becomes greater, which is evaluated better and may indicate a more accurate particle concentration value.

Figure 1:
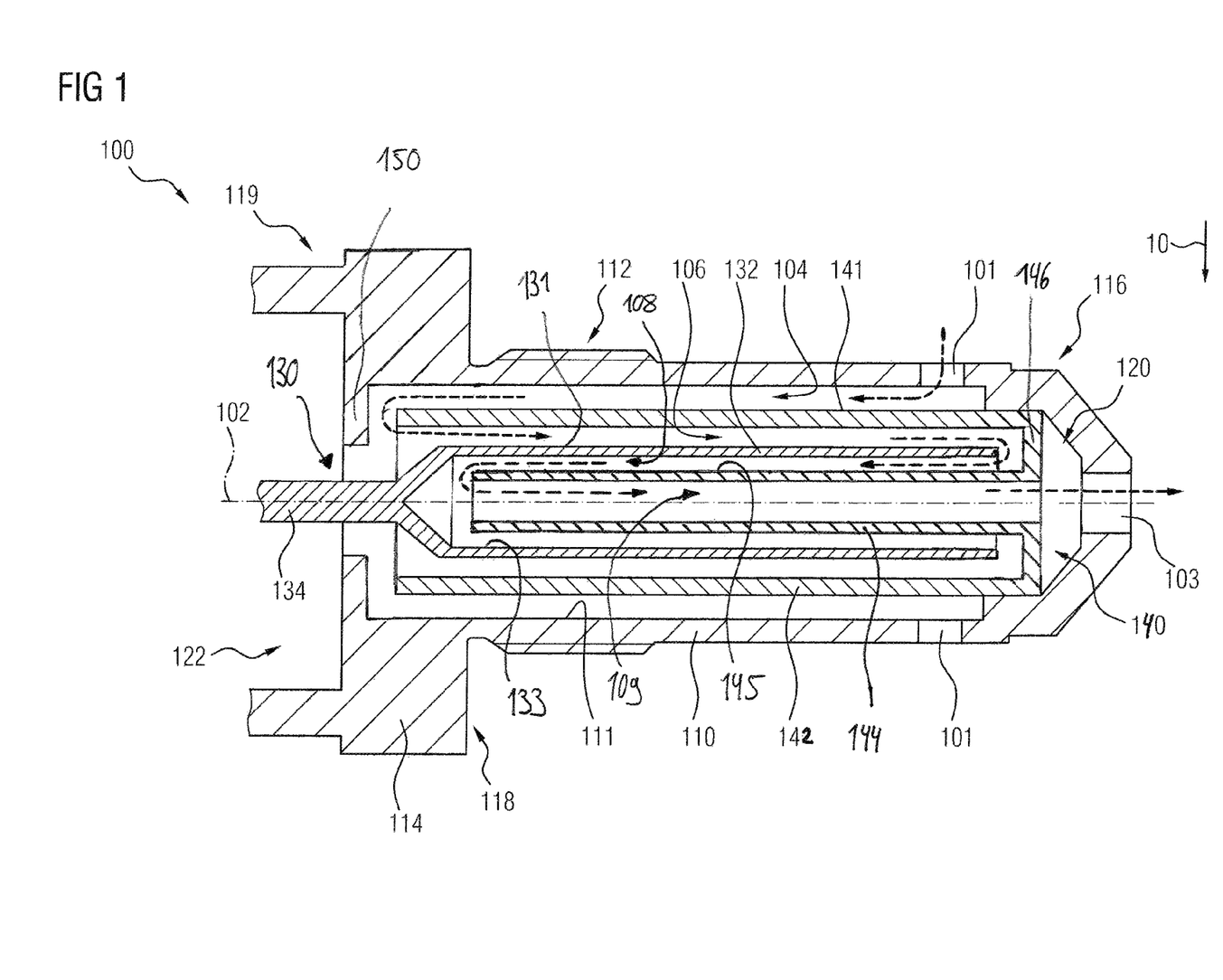
FIG. 1 shows a sectional view along a longitudinal axis through a particle sensor according to the invention.

FIG. 1 shows a section through a particle sensor 100 according to the invention, which has an essentially cylindrical housing 110, which extends essentially along a longitudinal axis 102. In further configurations, the housing 110 may be of a conical or stepped form. The housing 110 has a threaded section 112, and the particle sensor 100 may for example be screwed into an exhaust gas duct of an internal combustion engine (not shown). The housing 110 also has a region 114, for example in the form of an exterior hexagon, to which a corresponding tool is attached, in order that the particle sensor 100 may be screwed into the exhaust gas duct of the internal combustion engine as desired.

Provided within the housing 110 is a measuring region 120, which extends essentially along the longitudinal axis 102 between a first housing region 116, which is formed so as, in an installed state of the particle sensor 100, to project at least partially into a gas stream (indicated by an arrow 10 in FIG. 1) flowing through the exhaust gas duct of the internal combustion engine, and a second housing region 118. The first housing region 116 describes a front end region of the housing 110 and the second housing region describes a housing region of the housing 110 that is at a distance from the first housing region 116. More specifically, the measuring region 120 is set or defined in a direction parallel to the longitudinal axis 102 by the first housing region 116 and the second housing region 118.

The housing 110 also has a further housing region 119, which extends along the longitudinal axis 102 and lies opposite the first housing region 116 and provided in which is a contact-receiving region 122, in which electrical contacts (not shown) of the particle sensor 100 via which the particle sensor 100 is connected for example to a control unit of a vehicle may be at least partially accommodated.

Also arranged in the measuring region 120 is a sensor electrode 130, which is arranged coaxially to the longitudinal axis 102. The sensor electrode 130 includes a hollow measuring section 132, arranged within the measuring region 120, and a connecting section 134, extending along the longitudinal axis 102 through the second housing region 118 into the contact-receiving region 122. As shown in FIG. 1, the measuring section 132 is a hollow-cylindrical region. In further configurations, the measuring section 130 may be of a funnel-shaped or conical or stepped form. It is also possible for the measuring section 132 to have an undulating shape.

The connecting section 134 is formed so as to establish a connection of the measuring section 132 to electrical contacts (not shown) arranged in the contact-receiving region 122, via which the particle sensor 100 is connected to for example the control unit of the vehicle.

Furthermore, according to the embodiments shown in the drawings, the particle sensor 100 has a flow conducting element 140, which is arranged in the measuring region 120 and has a hollow first flow conducting section 142 and a hollow second flow conducting section 144, both of which are coupled to a base section 146. As shown in FIG. 1, the first and second flow conducting sections 142, 144 are each hollow-cylindrical sections. In further configurations, the first and/or second flow conducting sections 142, 144 may be of a funnel-shaped or conical or stepped form. It is also possible for the first and second flow conducting sections 142, 144 to have an undulating shape.

The first flow conducting section 142 is arranged with respect to the longitudinal axis 102 outside the measuring section 132 in the radial direction and coaxially thereto. The first flow conducting section 142 is arranged around the measuring section 132 of the sensor electrode 130 in such a way that a first flow path 104 is formed between a radial inner wall 111 of the housing 110 and a radial outer wall 141 of the first flow conducting section 142 in such a way that the gas stream flows through the first flow path 104 in a first direction, i.e. from the first housing region 116 in the direction of the second housing region 118, and a second flow path 106 is formed between the measuring section 132 and the first flow conducting section 142 in such a way that the gas stream flows through the second flow path 106 in a second direction opposite to the first direction, i.e. from the second housing region 118 in the direction of the first housing region 116.

The first flow path 104 and the second flow path 106 are each provided as essentially cylindrical regions, which are provided with respect to the longitudinal axis 102 coaxially to one another and are delimited or separated from one another by the first flow conducting section 142 of the flow conducting element 140. In general, however, the form of the first flow path 104 is defined by the form of the housing 110 and by the form of the first flow conducting section 142, and the form of the second flow path 106 is defined by the form of the first flow conducting section 142 and by the form of the measuring section 130. In order that the gas stream 10 may flow through the measuring region 120, the housing 110 has in the first housing region 116 at least one inlet opening 101, which is for example provided in the shell of the housing 110, and also an outlet opening 103 extending along the longitudinal axis 102. Alternatively, the outlet opening 103 may be provided in the base section 146 of the flow conducting element 140.

While the gas stream is flowing through the second flow path 106, it may come into contact with an outer wall 131 of the measuring section 132.

The second flow conducting section 144 is arranged with respect to the longitudinal axis 102 within the measuring section 132 in the radial direction and coaxially thereto. The measuring section 132 is arranged around the second flow conducting section 144 in such a way that a third flow path 108 is formed between a radial inner wall 133 of the measuring section 130 and a radial outer wall 145 of the second flow conducting section 144 in such a way that the gas stream flows through the third flow path 104 in the first direction, i.e. from the first housing region 116 in the direction of the second housing region 118. Furthermore, a fourth flow path 109 is formed in the hollow-cylindrical second flow conducting section 144 in such a way that the gas stream flows through the fourth flow path 106 in the second direction, i.e. from the second housing region 118 in the direction of the first housing region 116. In FIG. 1, the flow of the gas stream through the first flow path 104, the second flow path 106, the third flow path 108 and the fourth flow path 109 is indicated by a number of dashed arrows.

The third flow path 106 is provided as an essentially cylindrical region, which is provided with respect to the longitudinal axis 102 coaxially to the first flow path 104 and third flow path 106. In general, however, the form of the third flow path 108 is defined by the form of the measuring section 132 and by the form of the second flow conducting section 142.

The base section 146 is formed in such a way that the gas stream flows completely from the second flow path 106 into the third flow path 108, and thus cannot otherwise flow out from the particle sensor 100 out of the second flow path 106. The base section 146 is formed so as to deflect the gas stream flowing through the second flow path 106 into the third flow path 108 by a predetermined angle. This predetermined angle is preferably in a range between approximately 150° and approximately 210°, more preferably between approximately 170° and 190°, and is most preferably approximately 180°. The flow conducting element 140 is formed so as to guide the gas stream entering the particle sensor 100 through the inlet openings 101 through the measuring region 120 in such a way that the gas stream must pass the first flow path 104, the second flow path 106, the third flow path 108 and the fourth flow path 109 before the gas stream leaves the particle sensor 100 again through the outlet opening 103.

The hollow-cylindrical measuring section 132 is provided in such a way that it is arranged with respect to the longitudinal axis 102 between the first flow conducting section 142 and the second flow conducting section 142 in the radial direction. The gas stream consequently initially flows at least partially over the outer wall 131 of the measuring section 132 and subsequently also at least partially over the inner wall 133 of the measuring section 132. Through this flow guidance of the gas stream, the effective measuring surface or the effective measuring path of the measuring section 132 that comes into contact with the gas stream is at least partially increased and used almost completely.

The particle sensor 100 also has a deflection element 150, which is attached to the second housing region 118 and is formed so as to deflect the gas stream through the first flow path 104 into the second flow path 106. The deflection element 150 is preferably formed in one piece with the housing 110 and is in the form of a projection which extends with respect to the longitudinal axis 102 at least partially radially inward from the radial inner wall 111 of the housing 110. The deflection element 150 may have the effect that the gas stream through the first flow path 104 is deflected into the second flow path 106 in an optimized manner.

It is seen from FIG. 1 that the deflection element 150 deflects the gas stream by approximately 180°, which is schematically indicated in FIG. 1 by the arrow drawn in at this point. The deflection element 150 is formed so as to prevent the gas stream, including its entrained particles, from reaching the contact-receiving region 122, which is located outside the measuring region 120. The contact-receiving region 122 is separated from the measuring region 120 by the second housing region 118. Thus, the risk of excessive contamination by particles, such as soot, that are introduced into the particle sensor 100 by the gas stream is reduced and the gas sensor may operate reliably over a longer service life.

The electrostatic particle sensor 100 works in such a way that a high voltage, for example about 1000 V, is applied to the sensor electrode 130 together with the measuring section 132, whereas the flow conducting element 140 together with the at least one first flow conducting section 142 and the at least one second flow conducting section 144 are (electrically) grounded, that is to say are at 0 V. The gas flowing through the electrostatic particle sensor 100 is preferably exhaust gas containing soot particles, the soot particles becoming charged in the electrical field forming between the sensor electrode 130 and the flow conducting element 140 and being deposited on the sensor electrode 130, more precisely the measuring section 132, in the form of dendrites. When the dendrites reach a certain size or length, they break off and release their electrical charge to the flow conducting element 140, more precisely to the at least one first flow conducting section 142 and the at least one second flow conducting section 144. This charge may be measured in the form of an electrical current pulse and may indicate the particle concentration in the exhaust gas.

Figure 2:
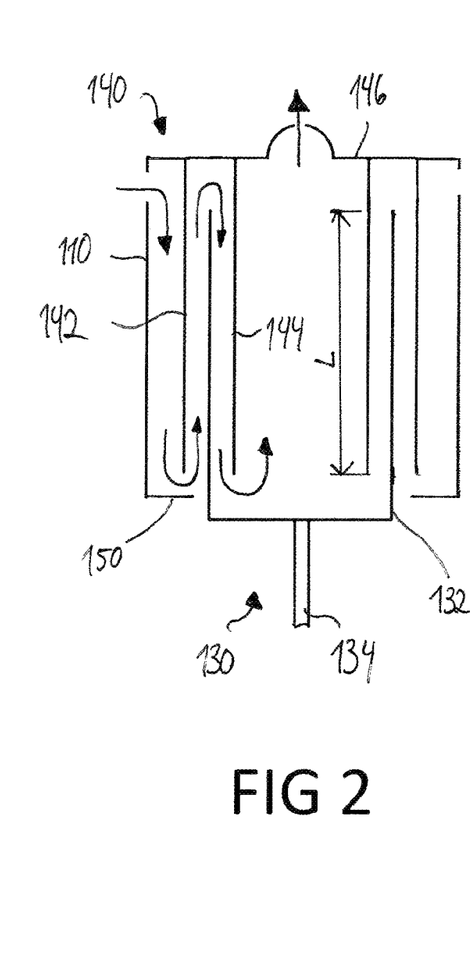
FIG. 2 shows a schematic view of the particle sensor according to the invention from FIG. 1.

With reference to FIG. 2, the particle sensor 100 shown in a sectional view in FIG. 1 is shown in a schematic view. FIG. 2 reveals that the measuring section 132 is arranged in the intermediate space between the first flow conducting section 142 and the second flow conducting section 144 in such a way that the flow path indicated by the arrows in FIG. 2 follows the first flow path 104, second flow path 106, third flow path 108 and fourth flow path 109 (also see FIG. 1).

Consequently, as already described with reference to FIG. 1, both the outer wall 131 and the inner wall 133 of the measuring section 132 are acted upon by the gas, which may lead to an increased active measuring surface or an increased active measuring path of the sensor electrode 130 and to an increased sensitivity of the particle sensor. This in turn may lead to more accurate measurement results. More specifically, compared to a particle sensor known from the prior art, the effective length L, which is defined as the overlap length of the measuring section 132 and the first and second flow conducting sections 142, 144 considered in cross section, may be at least partially increased in the particle sensor 100 according to the invention. In FIG. 2, it is even shown that in this configuration the effective length L is essentially doubled compared to the particle sensors known from the prior art, since, as already described above, both the outer wall 131 and the inner wall 133 of the measuring section 132 are acted upon by the gas, and thus the effective measuring surface or the effective measuring path of the sensor electrode 130 is almost doubled.

Figure 3:
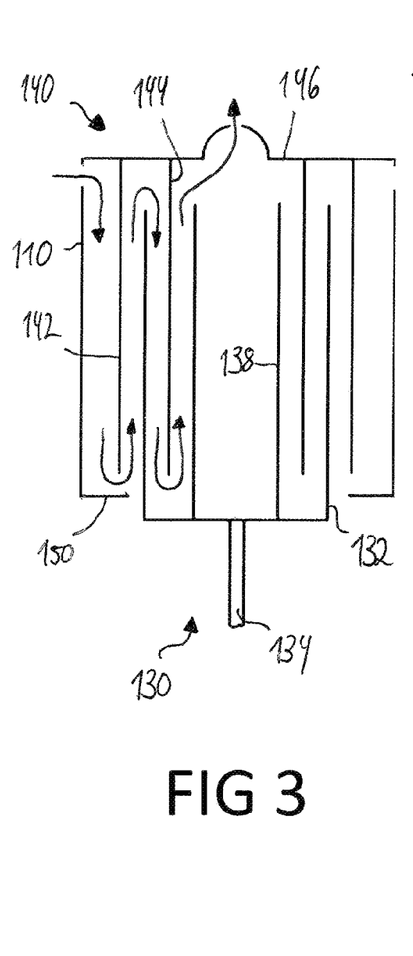
FIG. 3 shows a schematic view of a further particle sensor according to the invention.
Figure 4:
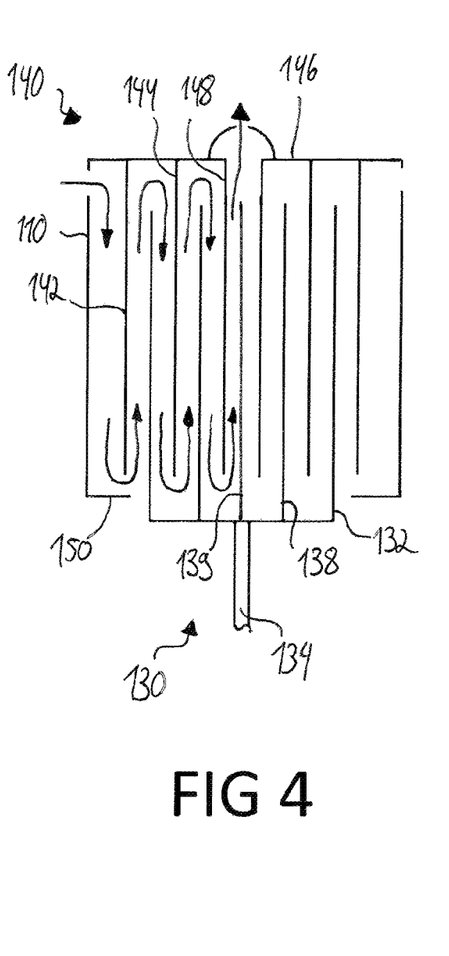
FIG. 4 shows a schematic view of a further particle sensor according to the invention.

FIGS. 3 and 4 show further embodiments compared to FIG. 2, in which the effective length L, and thus also the active measuring surface or the active measuring path, of the sensor electrode 130 are increased still further. More specifically, the sensor electrode 130 in the configuration of FIG. 3 has in addition to the measuring section 132 a hollow auxiliary measuring section 138, which is radially innerlying with respect to the longitudinal axis 102 and which is arranged with respect to the longitudinal axis 102 on the inside in the radial direction with respect to the second flow conducting section 144. Thus, the particle sensor 100 of FIG. 3 has a flow conducting element 140, provided with two flow conducting sections 142, 144, and a sensor electrode 130, provided with two measuring sections 132, 138, which are arranged relative to one another as engaging in one another in such a way that the effective measuring surface of the sensor electrode 130 with which the gas stream comes into contact with the measuring electrode or the effective measuring path is at least partially increased. As already described in FIG. 2, in the configuration of FIG. 3 the gas stream comes into contact with the outer wall 132 and the inner wall 133 of the measuring section 132 and additionally with the outer wall of the auxiliary measuring section 138. Consequently, the effective length of the configuration of FIG. 3 is increased in comparison with FIG. 2 by a further effective length L.

FIG. 4 is a further development of the configuration of FIG. 3, wherein the flow conducting element 140 has a third flow conducting section 148, which is arranged with respect to the longitudinal axis 102 inside the second flow conducting section 144 in the radial direction. In addition, the sensor electrode 130 also includes a rod-shaped central section 139, which extends along the longitudinal axis 102 and is arranged within the auxiliary measuring section 138. The sensor electrode 130 is arranged with its measuring section 132, auxiliary measuring section 138 and central section 139 in such a way that these sections each engage in a corresponding intermediate space between the first, second and third flow conducting sections 142, 144, 148. The central section 139 of the sensor electrode 130 may also be provided in the configurations shown in FIGS. 2 and 3.

In the configuration of FIG. 4, the effective length L of the sensor electrode 130 is further increased in comparison with the configurations of FIGS. 2 and 3, since the inner and outer walls of both the measuring section 132 and the auxiliary measuring section 138 and the outer wall of the central section 139 are impinged by the flow of the gas to be examined.

The nesting or the interengagement of the sensor electrode 130 and the flow conducting element 140 may be continued as desired, so that the flow path through the particle sensor, as shown in FIGS. 3 to 4, runs in a serpentine manner and consequently, each time a further (fourth, fifth, etc.) flow conducting section of the flow conducting element 140 and a further auxiliary measuring section of the sensor electrode 130 is provided, leads to an increase in the effective length L, and thus to an increase in the effective measuring surface or the effective measuring path, of the sensor electrode 130.

As an alternative to the serpentine shape of the flow path, it may be advantageous that the sensor electrode 130 has in the vicinity of the deflection element 150 at least one opening through which the gas may flow directly out of the first flow path 104 into the third flow path 108. In such a configuration, the gas is thus allowed to flow partially out of the first flow path 104 into the second flow path 106 and partially into the third flow path 108, the gas flowing in the same direction in both the second flow path 106 and the third flow path 108, to be specific from the second housing region 118 in the direction of the first housing region 116. In this configuration, too, both the outer wall 131 and the inner wall 133 of the measuring section 132 of the sensor electrode 130 are acted upon by the gas.

Figure 5:
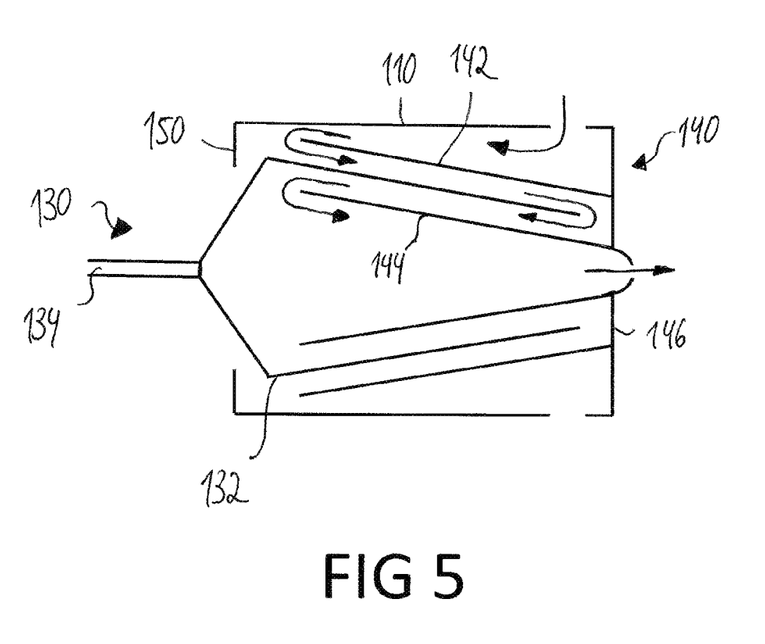
FIG. 5 shows a schematic view of a further particle sensor according to the invention.

FIG. 5 shows a further configuration of a particle sensor 100 according to the invention, in which the flow conducting sections 142, 144 are of a funnel-shaped or conical form and the measuring section 132 of the sensor electrode 130 is also of a funnel-shaped or conical form. The present invention is therefore not limited to a hollow-cylindrical form, but also includes funnel-shaped or conical configurations of the sensor electrode 130 and the flow conducting element 140.

At this point it should be expressly stated once again that there may also be combinations of hollow-cylindrical and funnel-shaped or conical forms. For example, the measuring section 132 may be of a hollow-cylindrical form, whereas the flow conducting sections 142, 144 are of a funnel-shaped or conical form. In addition, the configuration of the outer and inner walls of the respective sections is not limited to smooth surfaces. For example, the smooth surfaces may take the form of undulating (bellows-like) forms.

The measuring section 132, the at least one first flow conducting section 142 and the at least one second flow conducting section 144 have at least partially different diameters, which allow the interengagement of these sections described herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A particle sensor for detecting a quantity of particles in a gas stream in an internal combustion engine, the particle sensor comprising:
    a housing;
    a measuring region arranged in the housing, and the measuring region extends along a longitudinal axis;
    a sensor electrode, which is arranged in the measuring region;
    an at least partially hollow measuring section being part of the sensor electrode, the at least partially hollow measuring section extends coaxially to the longitudinal axis;
    a flow conducting element arranged in the measuring region, the flow conducting element further comprising:
        at least one first flow conducting section which extends coaxially to the longitudinal axis and is at least partially hollow; and
        at least one second flow conducting section which extends coaxially to the longitudinal axis and is at least partially hollow, the at least one second flow conducting section arranged with respect to the longitudinal axis within the first flow conducting section;
    wherein the measuring section, the first flow conducting section and the second flow conducting section are arranged engaging in one another in such a way that the measuring section is arranged with respect to the longitudinal axis between the first flow conducting section and the second flow conducting section in the radial direction.

2. The particle sensor of claim 1,
    a first flow path formed between the housing and the at least one first flow conducting section in such a way that the gas stream flows through the first flow path along the first direction; and
    a second flow path formed between the measuring section and the at least one first flow conducting section in such a way that the gas stream flows through the second flow path along a second direction essentially opposite to the first direction;
    wherein the at least one first flow conducting section is arranged with respect to the longitudinal axis outside around the at least one measuring section in the radial direction to form the first flow path and the second flow path.

3. The particle sensor of claim 2, further comprising:
a third flow path formed between the measuring section and the at least one second flow conducting section in such a way that the gas stream flows through the third flow path along the first direction; and
a fourth flow path formed within the at least one second flow conducting section in such a way that the gas stream flows through the fourth flow path along the second direction;
wherein the at least one second flow conducting section is arranged with respect to the longitudinal axis within the measuring section in the radial direction to form the third flow path and the fourth flow path.

4. The particle sensor of claim 2, further comprising a deflection element, which is formed to deflect the gas stream flowing through the first flow path into the second flow path by a predetermined angle.

5. The particle sensor of claim 4, wherein the predetermined angle is in a range between approximately 150° and approximately 210°, preferably between approximately 170° and 190°, and is most preferably approximately 180°.

6. The particle sensor of claim 1, the flow conducting element further comprising:
a base section coupled to the at least one first flow conducting section and the at least one second flow conducting section;
wherein the at least one first flow conducting section and the at least one second flow conducting section extend in the same direction from the base section.

7. The particle sensor of claim 1, the sensor electrode further comprising a rod-shaped central section which extends along the longitudinal axis and is arranged within the at least one second flow conducting section.

8. The particle sensor of claim 1, wherein the measuring section is essentially hollow-cylindrical or funnel-shaped.

9. The particle sensor of claim 1, wherein the at least one first flow conducting section is essentially hollow-cylindrical or funnel-shaped.

10. The particle sensor of claim 1, wherein the at least one second flow conducting section is essentially hollow-cylindrical or funnel-shaped.

11. The particle sensor of claim 1, further comprising:
an outlet opening, which extends in the flow conducting element along the longitudinal axis;
wherein the gas stream flows out of the measuring region through the outlet opening.

* * * * *